US009869887B2

(12) United States Patent
Taheri et al.

(10) Patent No.: US 9,869,887 B2
(45) Date of Patent: Jan. 16, 2018

(54) ADAPTIVE LIQUID CRYSTAL STRUCTURAL INTERFACE

(71) Applicant: ALPHAMICRON INCORPORATED, Kent, OH (US)

(72) Inventors: Bahman Taheri, Shaker Heights, OH (US); Ludmila Sukhomlinova, Kent, OH (US); Paul Luchette, Kent, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 307 days.

(21) Appl. No.: 14/361,162

(22) PCT Filed: Nov. 30, 2012

(86) PCT No.: PCT/US2012/067224
§ 371 (c)(1),
(2) Date: May 28, 2014

(87) PCT Pub. No.: WO2013/082380
PCT Pub. Date: Jun. 6, 2013

(65) Prior Publication Data
US 2014/0320776 A1    Oct. 30, 2014

Related U.S. Application Data

(60) Provisional application No. 61/565,169, filed on Nov. 30, 2011.

(51) Int. Cl.
*G02F 1/00* (2006.01)
*C09K 19/58* (2006.01)
(Continued)

(52) U.S. Cl.
CPC ............ *G02F 1/0045* (2013.01); *C09K 19/36* (2013.01); *C09K 19/586* (2013.01);
(Continued)

(58) Field of Classification Search
CPC ...................................................... G02F 1/132
See application file for complete search history.

(56) References Cited

U.S. PATENT DOCUMENTS 4,688,901 A    8/1987  Albert ....................... 350/350 S
5,668,614 A *  9/1997  Chien .................... C09K 19/02
                                              252/299.7
(Continued)

FOREIGN PATENT DOCUMENTS

JP      2002357815 A  * 12/2002
WO   WO 2010/124279 A1   10/2010 ............. H01L 31/00

OTHER PUBLICATIONS

Yoshioka, T., Ogata, T., Nonaka, T., Moritsugu, M., Kim, S.-N. and Kurihara, S. (2005), Reversible-Photon-Mode Full-Color Display by Means of Photochemical Modulation of a Helically Cholesteric Structure. Adv. Mater., 17: 1226-1229.*

(Continued)

*Primary Examiner* — Nathanael R Briggs
*Assistant Examiner* — Alexander Gross
(74) *Attorney, Agent, or Firm* — Renner Kenner Greive Bobak Taylor & Weber

(57) ABSTRACT

A structural interface having an adaptive liquid crystal material that is positioned to receive electromagnetic radiation and adapted to reflect a selective band of the received electromagnetic radiation so as to help with cooling of a structure in the summer and/or heating of the structure in the winter. The adaptive liquid crystal material is designed to change its selective reflection band when exposed to an activating temperature or an activating light or both. Depending on the interior and/or exterior conditions, the adaptive liquid crystal material has one or more selective reflection bands with a peak wavelength selected from the following: within a sunlight wavelength span, outside a thermal infrared wavelength span, outside the sunlight (Continued)

wavelength span, or within the thermal infrared wavelength span. The structural interface may be applied to an exterior or interior surface of a structural envelop or be integrated into a structural envelope material.

26 Claims, 4 Drawing Sheets

(51) Int. Cl.
C09K 19/36 (2006.01)
G02F 1/13 (2006.01)

(52) U.S. Cl.
CPC ............ C09K 19/588 (2013.01); G02F 1/132 (2013.01); C09K 2219/13 (2013.01); G02F 2201/343 (2013.01)

(56) References Cited

U.S. PATENT DOCUMENTS

| | | | |
|---|---|---|---|
| 5,766,518 A * | 6/1998 | Ishii ..................... | C09K 19/02 252/299.01 |
| 6,493,128 B1 | 12/2002 | Agrawal et al. ............. | 359/265 |
| 7,355,161 B2 | 4/2008 | Romig et al. ................ | 250/221 |
| 7,356,969 B1 | 4/2008 | Yurth et al. .................. | 52/171.3 |
| 7,416,684 B2 * | 8/2008 | Rankin, Jr. ............ | C09K 19/02 252/299.7 |
| 2005/0007506 A1 | 1/2005 | Faris et al. ..................... | 349/16 |
| 2005/0083564 A1 | 4/2005 | Mallya et al. ................. | 359/238 |
| 2005/0140918 A1 | 6/2005 | Bowley et al. ............... | 349/175 |
| 2008/0115428 A1 * | 5/2008 | Schlam ..................... | E06B 9/24 52/173.1 |
| 2008/0291541 A1 * | 11/2008 | Padiyath ................... | E06B 9/24 359/569 |
| 2008/0309598 A1 * | 12/2008 | Doane ................. | G02F 1/13475 345/87 |
| 2009/0290078 A1 * | 11/2009 | Yang ................... | G02F 1/13718 349/16 |
| 2009/0296188 A1 * | 12/2009 | Jain .......................... | E06B 9/24 359/245 |
| 2010/0259698 A1 | 10/2010 | Powers et al. ................. | 349/20 |
| 2011/0025934 A1 | 2/2011 | McCarthy et al. ............ | 349/20 |
| 2011/0096253 A1 * | 4/2011 | Zhang ................ | C09K 19/3068 349/16 |
| 2012/0242918 A1 | 9/2012 | Valyukh et al. ................ | 349/33 |

OTHER PUBLICATIONS

Li, J., Baird, G., Lin, Y.-H., Ren, H. and Wu, S.-T. (2005), Refractive-index matching between liquid crystals and photopolymers. Journal of the Society for Information Display, 13: 1017-1026.*

International Search Report dated Feb. 22, 2013 in corresponding application No. PCT/US2012/067224.

Written Opinion dated Feb. 22, 2013 in corresponding application No. PCT/US2012/067224.

* cited by examiner

The width of the selective reflection band depends on the intrinsic pitch and the birefringence of the liquid crystal host $$\Delta\lambda = \Delta nP + n_{ave}\Delta P$$

ADAPTIVE LIQUID CRYSTAL STRUCTURAL INTERFACE

CROSS REFERENCE TO RELATED APPLICATIONS

This application is a §371 application of International patent application number PCT/US2012/067224 filed Nov. 30, 2012, which claims the benefit of priority of U.S. provisional patent application No. 61/565,169 entitled: Liquid Crystal Structural Interface, filed Nov. 30, 2011, the entire contents of both of which are incorporated herein by reference.

BACKGROUND

A structure, such as a building or a vehicle, commonly includes an envelope defining its boundaries. The envelope separates the structure into an outside (exterior), which is often exposed to sunlight, and an inside (interior), which is often occupied by human beings or other thermal-radiation-emitting items. To keep such a structure at a comfortable temperature, it is typically cooled during the summer and heated during the winter.

Current materials used in the construction of structures are not energy efficient, contributing to increased cooling and/or heating costs through heat gain (during the summer) and/or heat loss (during winter months).

For example, in geographic regions that have colder winters, roofs are often constructed from materials that absorb solar radiation. This type of roof, however, results in excess heat production in the summer, resulting in increased energy costs (to cool buildings) as well as an increase in the local temperatures. To achieve a more energy efficient or even a zero energy building, it is necessary to minimize or eliminate this source of energy loss. Currently, the housing industry provides a thermal insulator between the roof and the internal structure. While somewhat effective, this does not eliminate the excess heat generated by the absorption of sun light in summer days. Similarly, traditional windows are also responsible for energy loss due to heat loss in the winter or heat gain in the summer.

As such, there is a need for an adaptive material which can alter its optical properties depending on the climate. Specifically, there is a need to address methods and materials whereby the thermal loading of conventional envelope materials can be adapted for mixed climate use by providing materials that will absorb sunlight energy during winter months (to help retain heat within a structure) but reflects sunlight during summer months (to help keep the structure cool).

SUMMARY

Provided herein is a structural interface having an adaptive liquid crystal material that is positioned to receive electromagnetic radiation and adapted to reflect a selective band of the received electromagnetic radiation. The adaptive liquid crystal material is designed to change its selective reflection band when exposed to an activating temperature or an activating light or both. The adaptive liquid crystal material can have one or more selective reflection bands with a peak wavelength selected from the following: within 400-1000 nm, outside 3000-10,000 nm, outside 400-1000 nm, within 3000-10,000 nm. The structural interface may be applied to an exterior or interior surface of a structure.

Thus, during summer, the interface can reflect sunlight away from the structure, and/or can transmit internally produced thermal radiation through the interface. Alternatively, or in addition, during winter, the interface can reflect internally produced thermal radiation back into the structure and/or can transmit sunlight through into the interior of the structure. This change in reflection/transmission is accomplished by pitch changes and/or phase transitions in the cholesteric liquid crystal medium.

In some embodiments, the liquid crystal material has a peak reflection ($\lambda_{max}$) within 400-1000 nm during hot conditions and a peak reflection ($\lambda_{max}$) outside 400-1000 nm during cold conditions.

In other conditions, the liquid crystal material has a peak reflection ($\lambda_{max}$) outside 3000-10,000 nm during hot conditions and a peak reflection ($\lambda_{max}$) within 3000-10,000 nm during cold conditions.

In some embodiments, the liquid crystal material has a peak reflection ($\lambda_{max}$) within 400-1000 nm during hot conditions and a peak reflection ($\lambda_{max}$) within 3000-10,000 nm during cold conditions.

In the case of a temperature-activated adaptive liquid crystal material, the activating temperature can be either an interior temperature or an exterior temperature.

In the case of a light-activated liquid crystal medium, the activating light has a wavelength in the solar spectrum.

In some examples, the liquid crystal material undergoes a phase transition between cholesteric and smectic when exposed to a temperature change of 10° C. or greater.

In other examples, the liquid crystal material includes a chiral dopant having a helical twisting power which can change by 20% or more when exposed to a temperature change of 10° C. or greater.

In other examples, the liquid crystal material includes a chiral dopant having a helical twisting power which can change by 20% or more when exposed to the activating light.

In some embodiments, the change in the selective reflection band is in excess of 2000 nm.

The selective reflection band may be at least 20 nanometers (nm) wide.

The liquid crystal material can include a mixture of one or more of the following: a nematic liquid crystal, a smectic liquid crystal, a chiral dopant, a photo-active chiral dopant, an up-converting dye, a polymer, a polymerizable component, and a cholesterol based chiral liquid crystal.

In some examples, the liquid crystal material includes two or more liquid crystal materials with different phase transition temperatures.

In some examples, the liquid crystal material has a birefringence greater than 0.03.

The liquid crystal material may include mixtures of opposing chirality.

The liquid crystal may further include a polarizer.

The structural interface described above may be: a layer applied to an exterior or interior surface of an envelope (laminated, painted, etc.), or is integrated into an envelope material.

In some examples, the structural interface is integrated into or is applied onto, a window, a wall or a roof.

Other features, details, utilities, and advantages of the present invention may be apparent from the following more particular written description of various embodiments of the invention as further illustrated in the accompanying drawings and defined in the appended claims.

DESCRIPTION

We disclose an adaptive liquid crystal structural interface that is capable of temperature-based or wavelength (light)-based alteration of its optical properties, specifically its transmission or reflection of selected regions of the electromagnetic radiation spectrum, including the sunlight and thermal infra-red regions of the spectrum. When applied to a structure, the adaptive interface helps cool and/or heat the structure by selectively reflecting light and/or transmitting light at different wavelength ranges based on the temperature needs of the structure (i.e. based on external weather conditions, internal temperature, or any combination of the two). "Light", as used herein, refers to electromagnetic radiation of one or more specific wavelengths.

This approach involves using photoinduced, and/or thermally induced changes in chirality of a cholesteric liquid crystal (CLC) material to alter the location and width of the selective reflection band of the CLC material.

The liquid crystal medium is formulated so that its pitch at relevant temperatures yields the desired reflection. The liquid crystal material can then be used in a liquid crystal structural interface to assist in energy savings in a building or other structure.

Definitions

"Activating light" refers to electromagnetic radiation of the appropriate wavelength(s) to induce a desired change in the selective reflection band of the adaptive liquid crystal material. The wavelength of the activating light is within the solar spectrum (including UV, visible, and infrared spectra).

"Activating temperature" refers to a temperature that induces a desired change in the selective reflection band of the liquid crystal material.

"Adaptive liquid crystal material" or "liquid crystal medium" are used interchangeably and refer to a liquid crystal material that can change its reflection band when exposed to an activating light or activating temperature or both.

"Envelope" or "structural envelope" refers to any part of a structure that separates the structure into an outside (exterior), which is often exposed to sunlight, and an inside (or interior). Envelops include walls, roof, windows, etc.

"Light", as used herein, refers to electromagnetic radiation of one or more specific wavelengths.

"Location of a selective reflection band" refers to the location of the wavelength being reflected along the electromagnetic spectrum.

"Sunlight wave-length span" refers to light that has a wavelength from 400-1000 nm.

"Thermal infrared wavelength span" refers to electromagnetic radiation with a wavelength of about 3000-10,000 nm.

Figure 1:
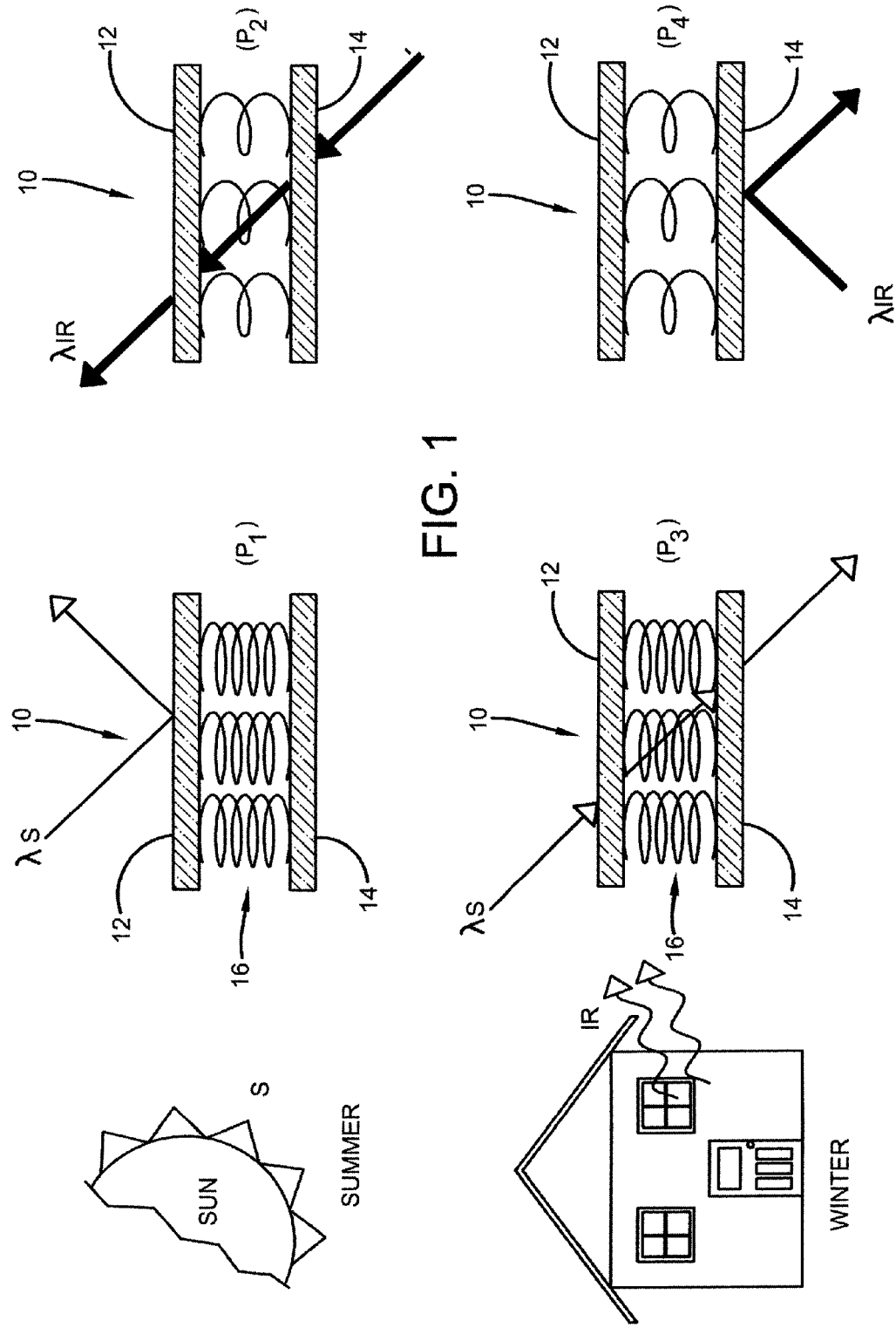
FIG. 1 shows examples of the liquid crystal structural interface according to the concepts of the present invention and the interface's reflection band in hot or cold conditions, wherein $P_1$, $P_2$, $P_3$ and $P_4$ represent different pitch values of the liquid crystal medium.

Referring now to the drawings, FIG. 1 shows a schematic drawing of a liquid crystal structural interface 10. An outer surface 12 of the structural interface 10 is exposed to sunlight and an inner surface 14 faces an interior of a structure. The inner surface 14 may be exposed to or otherwise receive thermal infrared radiation generated inside the structure, for example from interior heaters or body heat. The structural interface 10 includes a liquid crystal medium 16 which can change its reflection band when exposed to an activating temperature, or an activating light.

As is shown in FIG. 1, the liquid crystal medium 16 is adapted to help cool and/or heat the structure, or the envelope of the structure (e.g. roof, window, wall), by reflecting different wavelengths of light, referred to herein as the selected reflection band, based on temperature or light conditions.

Accordingly, the liquid crystal medium 16 is adapted to reflect more sunlight in hot (summer) conditions as compared to during cold winter conditions. This is accomplished by the liquid crystal medium 16 being reflective at wavelengths in the sunlight-wavelength span ($\lambda S$) (i.e. 400-1000 nm, see FIG. 1) during hot conditions. In some embodiments, the liquid crystal medium 16 can transmit more sunlight during cold (winter) conditions as compared to summer conditions so that sunlight may be absorbed by the structure. This is accomplished by the liquid crystal medium being reflective at wavelengths outside the sunlight-wavelength span during cold conditions. In some embodiments, the liquid crystal medium has a peak reflection ($\lambda_{max}$) within the 400-1000 nm wavelengths during hot conditions (i.e. $400 \leq \lambda_{max} \leq 1000$ nm). In other examples, the selective reflection band as a peak ($\lambda_{max}$) outside 400-1000 nm during cold conditions (i.e. $\lambda_{max} < 400$ nm or $\lambda_{max} > 1000$ nm). In some examples, the liquid crystal material has a peak reflection within the 400-1000 nm wavelengths during hot conditions and a peak reflection outside 400-1000 nm during cold conditions.

Also contemplated herein is a liquid crystal medium adapted to transmit internally produced thermal infrared radiation during summer temperatures and/or to reflect such internally produced thermal infrared radiation back into the interior of the structure during winter temperatures. As shown in FIG. 1, in some embodiments, the liquid crystal medium has a peak reflection ($\lambda_{max}$) within the thermal infrared wavelength span ($\lambda_{IR}$) of 3000-10,000 nm during cold conditions ($3000 \leq \lambda_{max} \leq 10,000$ nm). In some embodiments, during hot conditions, the liquid crystal medium has a peak reflection ($\lambda_{max}$) outside the thermal-infrared-wavelength span $\lambda_{IR}$ (i.e. ($\lambda_{max} < 3000$ nm or $\lambda_{max} > 10,000$ nm). In some examples, the liquid crystal medium has a peak reflection within the thermal-infrared-wavelength span during cold conditions and a peak reflection outside the thermal-infrared-wavelength span during hot conditions. The term "thermal infrared" refers to temperatures produced by body heat, interior household heaters, etc.

In some embodiments, the adaptive interface may perform both functions described above, i.e. selectively reflect the sunlight wavelength span during summer conditions and selectively reflect energy in the thermal infrared wavelength span during winter conditions.

"Cold conditions" as described herein, refer to either exterior or interior temperatures, or both. For exterior temperatures, it refers to temperatures of less than about 20° C. In some examples, it refers to temperatures less than about 15°, 10°, 5°, 0°, −5° or −10° C. depending upon the intended climate for the adaptive interface. In addition, or in the alternative, if the interface is placed inside a structure, it can react to interior temperatures. Thus, cold conditions can mean cold interior temperatures below about 20° C. In some examples, it refers to interior temperatures less than about 15°, 10° C., etc.

"Hot conditions", similarly, refer to both exterior and/or interior temperatures. Hot exterior temperatures are those greater than about 25° or 30° C. In some examples, it refers to temperatures greater than about 35°, 40°, 45°, 50°, 55°, 60° C., depending upon the intended climate for the adaptive interface. Inside hot conditions refer to interior temperatures above about 20° C. In some examples, it refers to interior temperatures above about 25°, 30°, 35°, or 40° C.

The liquid crystal medium passively adapts the interface's reflective characteristics in response to either an activating temperature, an activating light, or both. The term "passively" means that the liquid crystal medium does not depend upon application of an electric field to perform this reflective adaptation. Instead, the surrounding temperature or light is used as the interface's control "switch." The term "passively" also refers to the fact that the liquid crystal medium does not require any dyes or colorants to perform the functions described herein. Although colorants or dyes may be added, e.g. to impose a specific color or to enhance performance, they are not required.

Liquid Crystal Medium

Liquid crystals are a class of materials which exhibit a mesomorphic phase between that of a solid and a liquid. In particular, similar to that of a crystal, the molecules in a liquid crystal are oriented in a specific direction. However, unlike a crystal, each molecule is not fixed to a specific location. In fact, like a liquid, the molecules are free to move. Therefore, liquid crystal molecules behave in a manner intermediate between that of a solid and a liquid and are hence called liquid crystals. The crystalline nature of the material results in unique optical properties such as birefringence while the fluid nature of the material allows for large changes in properties with small external stimuli. The direction of the general orientation of the liquid crystal molecules is signified by a vector called the director; and the degree of the molecular order is termed the "order parameter". Liquid crystals, in turn, can exhibit several sub-phases as they are heated between their melting temperatures and their isotropic temperatures.

Figure 2:
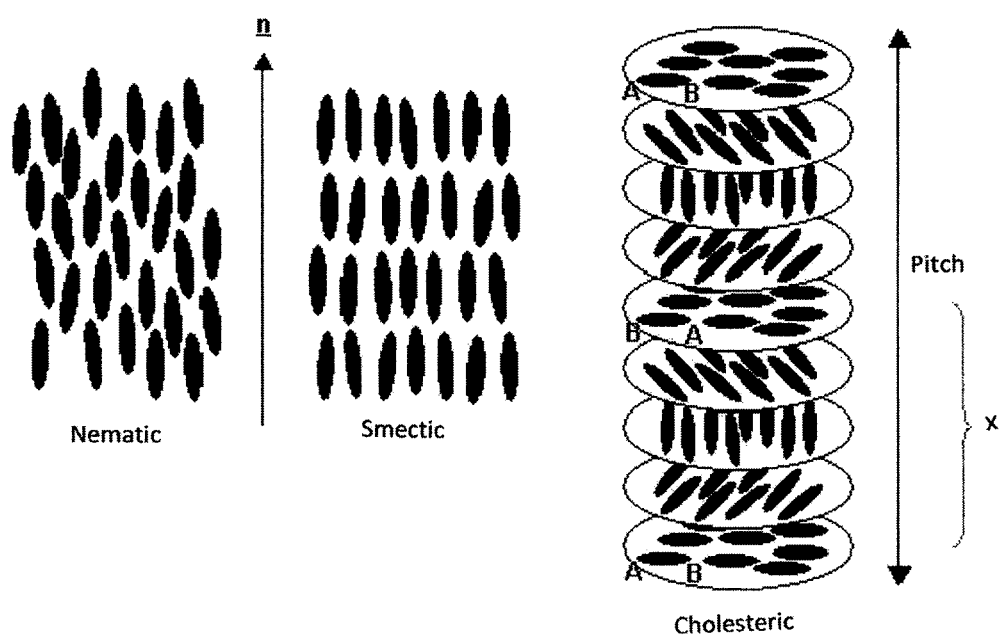
FIG. 2 is a schematic drawing of nematic, smectic and cholesteric liquid crystalline phases.

FIG. 2 shows the three liquid crystalline phases of interest: Nematic, Cholesteric, and Smectic. For the sake of brevity, we will use these terms in their most general sense. In other words we will not distinguish between various smectic phases (A, C), nor between cholesteric and nematic nomenclatures. The optical properties of these sub-phases can be significantly different and are the basis of the current liquid crystal structural interface.

The cholesteric (or chiral nematic) liquid crystal phase is typically composed of nematic mesogenic molecules, some fraction of which contain a chiral center which produces intermolecular forces that favor alignment between molecules at a slight angle to one another. This leads to the formation of a structure which can be visualized as a stack of very thin 2-D nematic-like layers with the director in each layer twisted with respect to those above and below. (See FIGS. 2 and 3), forming a continuous helical pattern (or structure).

An important characteristic of the cholesteric mesophase is the pitch. The pitch, p, is defined as the distance it takes for the director to rotate one full turn in the helix. A byproduct of the helical structure of the chiral nematic phase is its ability to selectively reflect light of wavelengths equal to the pitch length.

The wavelength of the reflected light can be controlled by adjusting the chemical composition of the liquid crystal material, since cholesterics can either consist of exclusively chiral molecules or of nematic molecules with a chiral dopant dispersed throughout. In some cases, the dopant formulation and concentration is used to adjust the chirality and thus the pitch. The pitch of the CLC is determined by the helical twisting power (HTP) of the chiral dopant, which can vary significantly depending on the composition or phase of the host liquid crystal.

If the concentration and helical twisting power (HTP) of the chiral dopant is selected so that the pitch of the cholesteric is equal to the wavelength of the light within the medium, the incident light undergoes Bragg reflection (similar to x-rays from a crystal or light from a hologram). The peak of the reflection ($\lambda_{max}$) is related to the average index of refraction ($n_{ave}$) and the pitch of the CLC (P), and is given by:

$$\lambda_{max} = n_{ave} P$$

Figure 4:
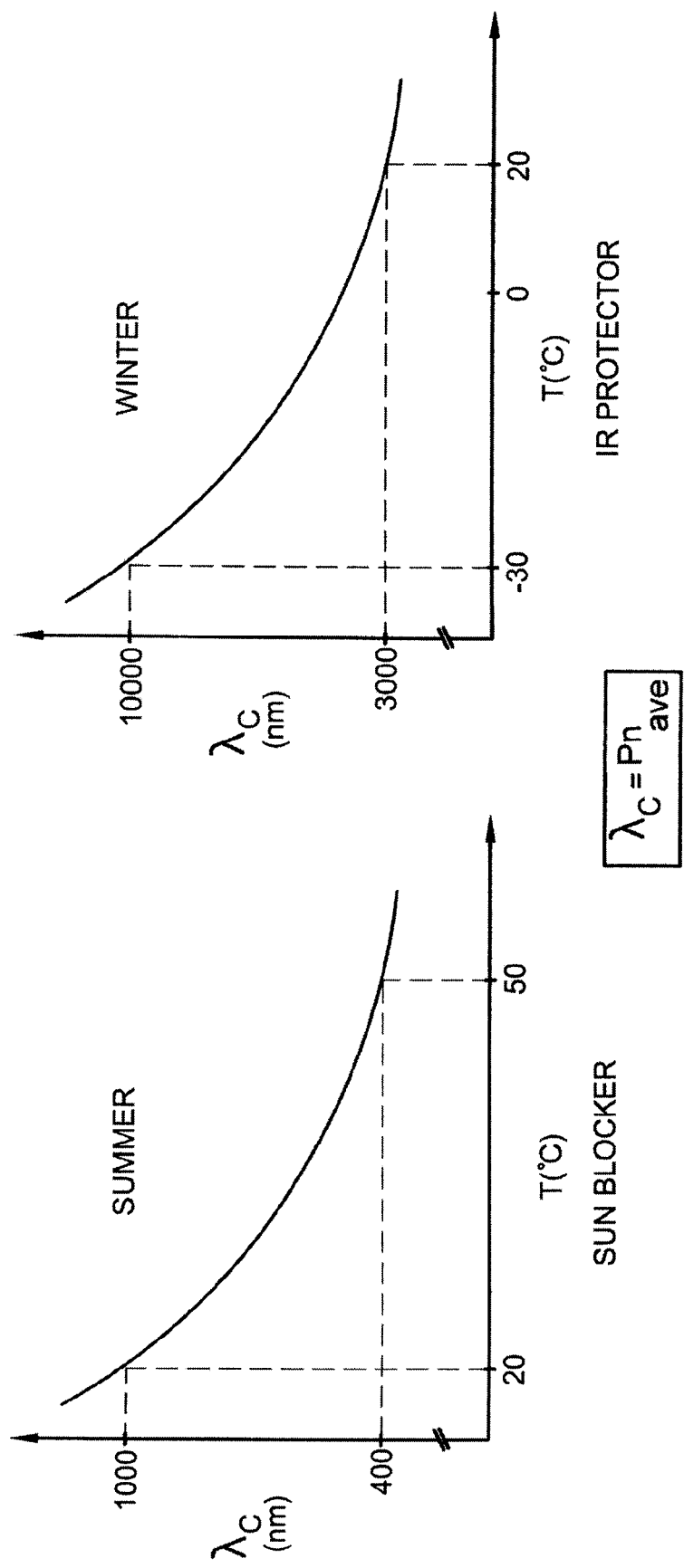
FIG. 4 shows two graphs that represent the change in the reflection band of an adaptive liquid crystal material with changing temperatures.

FIG. 4 shows two graphs that show an example of the different reflection bands of the liquid crystal material in the summer versus the winter. In FIG. 4, $\lambda C$ refers to the center of the reflection band peak and has the formula $\lambda C = P n_{ave}$, where P is pitch and $n_{ave}$ is the average index of refraction. The width of the reflection band $\Delta\lambda$ is equal to $\Delta nP$, where $\Delta n$ is the birefringence.

Most cholesteric liquid crystals fall into two broad categories: those used for displays and those used as temperature sensors (thermometers). Those materials used for displays are designed not to be temperature sensitive so as not to alter the quality of the display. On the other hand, those materials developed for use as thermometers are extremely temperature sensitive, so that even a small (e.g. 0.1° C.) change on temperature can result in a significant change in the pitch. The temperature-based adaptive liquid crystal material disclosed herein is designed to be somewhere in between the previously developed materials, i.e. so that it responds to a relatively large (e.g. 10° C. or greater) change in temperature.

In some examples, the pitch of a CLC can be altered so that the CLC reflects light with wavelengths from the sunlight wavelength span to the thermal infrared wavelength span.

In some examples, the liquid crystal material of the interface can be made up of one or more liquid crystals, with each liquid crystal having a single pitch or multiple pitches (such as a pitch gradient), and each liquid crystal being able to change its pitch and therefore selective reflection band, so that together they can change the reflection band of the liquid crystal material as a whole.

Figure 3:
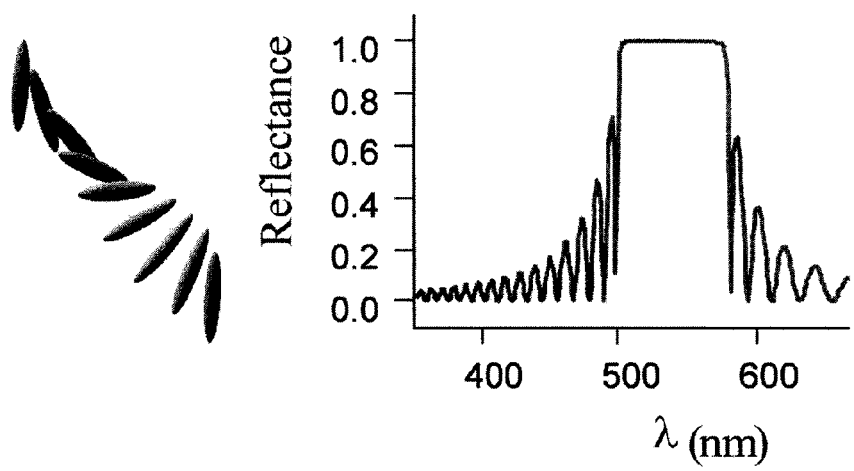
FIG. 3 is a schematic drawing of the structure of a cholesteric liquid crystal (CLC) and a graph showing the reflection band of a CLC medium.

Since the CLC helical structure is handed, the reflected light is also handed, with the helicity matching that of the CLC. FIG. 3 shows the chiral nematic structure and the corresponding normalized reflection band for circular light. The width of the selective reflection band ($\Delta\lambda$) depends on the intrinsic pitch (P) and the birefringence ($\Delta n$) of the liquid crystal host. It is narrow compared to the entire visible spectrum and is given by:

$$\Delta\lambda = \Delta nP + n_{ave}\Delta P$$

Structural Interface

The structural interface disclosed herein uses photo-induced, as well as thermal induced changes in chirality (pitch) of a high birefringence cholesteric liquid crystal (CLC) medium to alter the location and width of the material's selective reflection band. (See FIG. 4) The liquid crystal medium is formulated so that its pitch at relevant temperatures yields the desired reflection.

In some embodiments, phase changes between the chiral liquid crystal and smectic phases of liquid crystal can be used to achieve the above system. Accordingly, the liquid crystal medium is formulated so that it undergoes a phase transition from smectic-to-cholesteric, or vice versa, when exposed to a temperature change of 10° C. or greater. In some examples, it undergoes the phase transition when exposed to a temperature change of 15° C., 20° C., 25° C., 30° C., 35° C., 40° C., 45° C., 50° C., 55° C., 60° C., 65° C., 70° C., 75° C. or 80° C. In other words, the structural interface operates by having a phase-transition when exposed to large temperature changes, i.e. the pitch does not alter dramatically with only small temperature changes. It may be noted that this is opposite to the approach used in liquid crystal thermometers, wherein a 0.1 temperature degree change can alter pitch by a few hundred nanometers.

In some embodiments, the liquid crystal medium is a cholesteric liquid crystal (CLC) having a chiral dopant which can change its pitch upon exposure to an activating light. In some examples, the helical twisting power of the chiral dopant changes by 20% or more when exposed to the activating light. In some examples, the helical twisting power changes by 25%, 30%, 35%, or 40% or more when exposed to the activating light.

In other embodiments the liquid crystal medium includes a chiral dopant having a helical twisting power (HTP), and the helical twisting power changes by 20%, 25%, 30%, 35%, or 40% or more when exposed to a temperature change of 10° C. or greater. In some examples, the HTP change is in response to a temperature change of 15° C., 20° C., 25° C., 30° C., 35° C., 40° C., 45° C., 50° C., 55° C., 60° C., 65° C., 70° C., 75° C. or 80° C.

The structural interface can be formulated so that in some examples, the change in the reflection band is in excess of 2000 nanometers (e.g. from below 700 nm to above 3000 nm).

The liquid crystal medium is preferably formulated so that the width of the reflective band ($\Delta\lambda$) is relatively broad (e.g., at least 20 nanometers wide, or at least 30, 40, 50, 60, 70, 80, 90 or 100 or more nanometers wide). This can be achieved in various ways, including: increasing the birefringence or local changes in the pitch so that a large variation in the overall pitch is obtained. Variations in the width and location of the reflection band can be obtained using either materials with a variety of phase transition temperatures or utilizing the natural variation with thickness to obtain a variation with pitch.

In some embodiments, the reflection band can also be broadened by utilizing several materials with slightly different phase transition temperatures. In that case, at a given temperature, the various mixtures will have a reflection band slightly different from one another. The resulting combination of these materials in the structural interface will give broader reflection spectrum at any given temperature.

In some cases, the pitch P can be between 2-5 micrometers (e.g., less than 6 micrometers, less than 5 micrometers, less than 4 micrometers, less than 3 micrometers, and/or about 2 micrometers). The birefringence can be equal to or greater than 0.03, 0.04, 0.05, 0.06, 0.075 or any number up to and including 0.28.

In some examples, the total reflection is increased by reflecting both polarizations of incident light. Since the reflected light possesses a handedness corresponding to that of the helical shape, the increase in reflection can be accomplished by using liquid crystal medium that employs mixtures with opposing chirality. Such a mixture preferably has materials with similar phase transition properties, although this is not necessary.

The liquid crystal medium in the structural interface can include a number of compounds, including one or more nematic liquid crystals, smectic liquid crystals, chiral dopants, photo-active chiral dopant, up-converting dyes and materials, polymers, polymerizable components, and cholesterol based chiral liquid crystals. In some examples, the liquid crystal medium comprises two or more liquid crystal materials with different phase transition temperatures. An up-converting dye is a dye that changes chirality with exposure to light.

It should also be understood that any or all of the embodiments and variants described above may be paired with a number of optional components without altering their essential nature or function. These may include, but are not limited to, substrates, fixed tints, adhesives, sealants, wave plates, reflectors, partial reflectors, transreflectors, low-emissivity materials, UV-absorptive or reflective materials, and/or IR absorptive or reflective materials.

The chiral materials may be freely dispersed in the liquid crystal, may be incorporated into a polymer network, or incorporated into or grafted on to the surface of a particle.

In some embodiments, the liquid crystal structural interface may by a single layer.

In other embodiments, the liquid crystal structure can include two or more layers.

In some embodiments, the liquid crystal material may be in a liquid crystal cell (i.e. interposed between two opposing substrates).

The liquid crystal structural interface can be integrated into the envelope surrounding a structure (e.g., a building or a part thereof or a window). Alternatively, the liquid crystal medium may be incorporated into a layer, film, coating or paint that can be applied to an exterior or interior surface of a structure and/or an envelope to create the interface. In the case of a window, the adaptive interface may be placed on the interior surface of a window (and thus respond to interior temperatures), or it may be placed on the exterior surface of a window, and thus respond to exterior temperatures.

Below are some examples of different chiral materials that can be used in the adaptive liquid crystal material. It should be noted that numerous other combinations of liquid crystal materials and chiral dopants are possible beyond those discussed or enumerated here and may be employed without departing from the spirit of this embodiment.

EXAMPLES

The incorporation of additives into liquid crystal mixtures can be used to control the supramolecular chirality of a cholesteric liquid crystal. This additive can be a chiral, photochromic or photochiral material. Generally light and heat are used for switching between two states in liquid crystal systems.

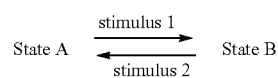

Described below are examples of dopants that can be added to liquid crystals to form materials that can change pitch in response to an activating light.

Light Sensitive Systems

Example 1

This type of chiral additive molecule contains a chiral center and a switching moiety situated remotely from the chiral center. The chiral center doesn't change upon photo-activation of the light. At the same time conformational change in switching unit influences the chiral properties of the entire molecule, e.g. HTP ($\beta M$). To induce conformational changes, the following photoresponsive switching units can be used in chiral additives: olefin, azobenzene fulgide, diarylethene.

Chiral menthone derivatives containing olefin moiety can undergo photoinduced cis-trans isomerizaton, which leads to significant reduction of HTP. (Scheme 1).

Scheme 1

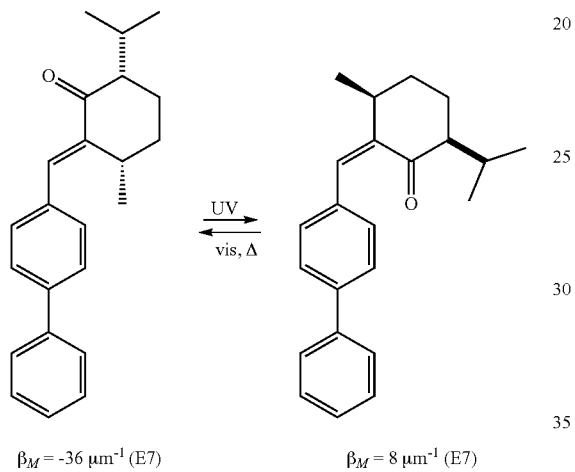

$\beta_M = -36\ \mu m^{-1}$ (E7)   $\beta_M = 8\ \mu m^{-1}$ (E7)

Photochiral diarylethenes undergo a reversible 6π electron cyclisation upon irradiation, leading to distinct changes in structure. These materials can be used for reversible cholesteric to nematic transition and manipulation of cholesteric pitch (Scheme 2).

Scheme 2

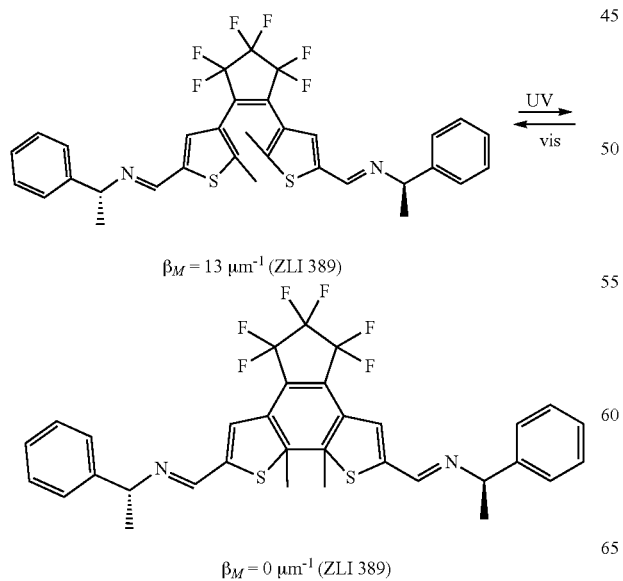

$\beta_M = 13\ \mu m^{-1}$ (ZLI 389)

$\beta_M = 0\ \mu m^{-1}$ (ZLI 389)

Indolylfulgides undergo similar 6π electron cyclization. The incorporation of a chiral binaphthol moiety results in a bistable system with very distinct increase in HTP (scheme 3).

Scheme 3

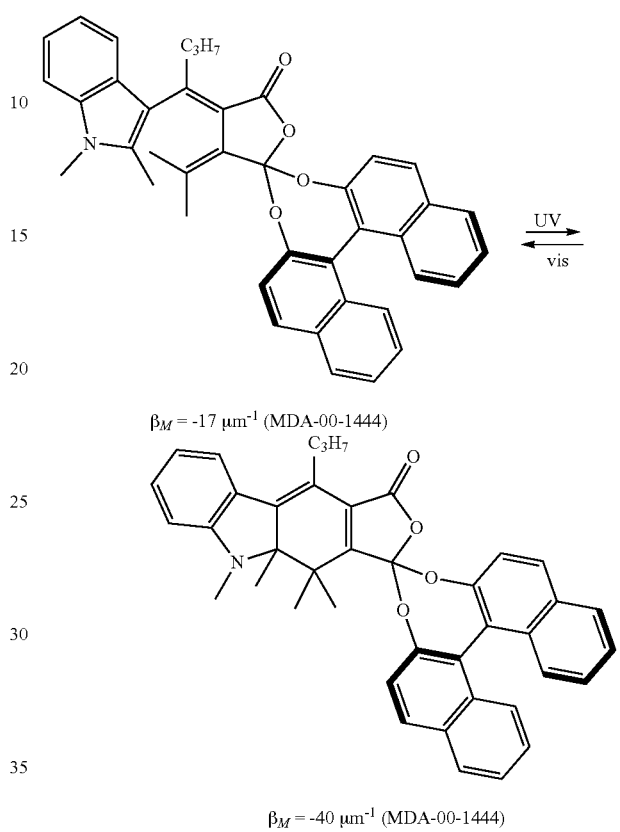

$\beta_M = -17\ \mu m^{-1}$ (MDA-00-1444)

$\beta_M = -40\ \mu m^{-1}$ (MDA-00-1444)

Chiral azobenzene-based additives can undergo reversible trans-cis isomerization. (Scheme 4)

Scheme 4

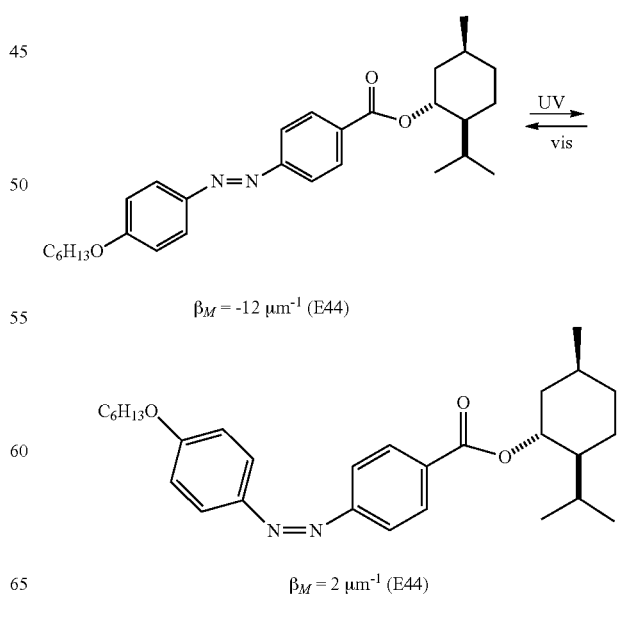

$\beta_M = -12\ \mu m^{-1}$ (E44)

$\beta_M = 2\ \mu m^{-1}$ (E44)

Example 2

In the other type of chiral additive, the changes occur at the chiral center of the molecule. Chiral properties of the chiral center in the molecule are inversed upon irradiation. This type of chiral additives is much more likely to show inversion of the cholesteric helix sign (e.g. left handed to right handed). Scheme 5 shows an overcrowded alkene that has a P chirality. Upon irradiation, it is converted to its unstable M isomer. The thermal isomerization of unstable isomer back to stable isomer readily occurs at room temperature. These chiral dopants were found to induce fully reversible color change of a liquid crystal across the entire visible spectrum.

Scheme 5

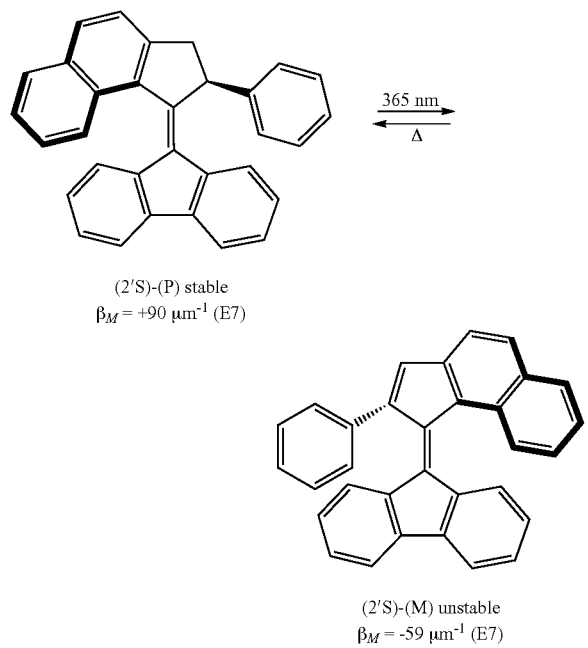

(2'S)-(P) stable
$\beta_M = +90\ \mu m^{-1}$ (E7)

(2'S)-(M) unstable
$\beta_M = -59\ \mu m^{-1}$ (E7)

Example 3

In temperature sensitive systems, the system can be classified into two types. In the first, the chirality of the CLC changes with external temperature. The temperature dependence of the helical pitch has been found, for example, in menthone derivatives.

The second type consists of thermochromic liquid crystal mixtures, which are usually formulated so that they exhibit underlying smectic phase and the reflection band change occurs over phase transition temperatures from smectic to cholesteric. For example, in cholesteryl ester liquid crystal mixtures this change occurs over the range of 1° to 10° C.

Although the description above contains many specificities, and reference to one or more individual embodiments, these should not be construed as limiting the scope of the invention but rather construed as merely providing illustrations of certain exemplary embodiments of this invention. There are various possibilities for implementation of different materials and in different configurations and those skilled in the art could make numerous alterations to the disclosed embodiments without departing from the spirit or scope of this invention.

The invention claimed is:

1. A structural interface comprising an adaptive cholesteric liquid crystal material positioned to receive electromagnetic radiation and adapted to reflect a selective band of said electromagnetic radiation;
   wherein the adaptive cholesteric liquid crystal material undergoes a reversible photo-induced or thermal induced change in chirality or both such that it reversibly changes its pitch and thereby its selective reflection band when exposed to an activating temperature or an activating light or both without undergoing phase transition,
   wherein the cholesteric liquid crystal material comprises a chiral dopant having a helical twisting power, and wherein said helical twisting power changes by 20% or more when exposed to a temperature change of 10° C. or greater, or when exposed to said activating light, or both, and
   wherein the adaptive cholesteric liquid crystal material has one or more selective reflection bands with a peak wavelength ($\lambda_{max}$) selected from:
   within 400-1000 nm during hot conditions and outside 400-1000 nm during cold conditions; or
   within 3000-10,000 nm during cold conditions and outside 3000-10,000 nm during hot conditions.

2. The structural interface of claim 1, wherein the activating temperature is an exterior temperature.

3. The structural interface of claim 1, wherein the activating temperature is an interior temperature.

4. The structural interface of claim 1, wherein the activating light has a wavelength in the solar spectrum.

5. The structural interface of claim 1, wherein the cholesteric liquid crystal material has a peak reflection ($\lambda_{max}$) within 400-1000 nm during hot conditions and a peak reflection ($\lambda_{max}$) within a thermal infrared wavelength span produced by body heat during cold conditions.

6. The structural interface of claim 1, wherein the change in the selective reflection band is in excess of 2000 nanometers (nm).

7. The structural interface according to claim 1, wherein the selective reflection band is at least 20 nanometers (nm) wide.

8. The structural interface according to claim 1, wherein the cholesteric liquid crystal material comprises a mixture of one or more of: a nematic liquid crystal, a smectic liquid crystal, a chiral dopant, a photo-active chiral dopant, an up-converting dye, a polymer, a polymerizable component, and a cholesterol based chiral liquid crystal.

9. The structural interface according to claim 1, wherein the cholesteric liquid crystal material comprises two or more liquid crystal materials with different phase transition temperatures.

10. The structural interface according to claim 1, wherein the cholesteric liquid crystal material has a birefringence greater than 0.03.

11. The structural interface according to claim 1, wherein the cholesteric liquid crystal material comprises mixtures of opposing chirality.

12. The structural interface according to claim 1, wherein said structural interface is selected from one or more of the following:
   a layer applied to an exterior or interior surface of a structure,
   a layer applied to a window,
   integrated into an envelope material, or
   integrated into a window.

13. The structural interface according to claim 1, further comprising a polarizer.

14. A structural interface comprising an adaptive liquid crystal material positioned to receive electromagnetic radiation and adapted to reflect a selective band of said electromagnetic radiation;
- wherein the adaptive liquid crystal material undergoes a reversible photo-induced change in chirality such that it changes its selective reflection band when exposed to an activating light and reverts to its original chirality when the activating light is removed without undergoing phase transition, and
- wherein the adaptive liquid crystal material has one or more selective reflection bands with a peak wavelength ($\lambda_{max}$) selected from:
  - (a) within 400-1000 nm during hot conditions and outside 400-1000 nm during cold conditions;
  - (b) outside 3000-10,000 nm during hot conditions and within 3000-10,000 nm during cold conditions; or
  - (c) within 400-1000 nm during hot conditions and within 3000-10,000 during cold conditions.

15. The structural interface according to claim 14, wherein the liquid crystal material comprises a mixture of one or more of: a nematic liquid crystal, a smectic liquid crystal, a chiral dopant, a photo-active chiral dopant, an up-converting dye, a polymer, a polymerizable component, and a cholesterol based chiral liquid crystal.

16. The structural interface according to claim 14, wherein the liquid crystal material comprises two or more liquid crystal materials with different phase transition temperatures.

17. The structural interface according to claim 14, wherein said structural interface is a layer applied to an exterior or interior surface of a structure.

18. The structural interface according to claim 14, wherein said structural interface is integrated into or is applied onto a window.

19. The structural interface according to claim 14, wherein the change in the selective reflection band is in excess of 2000 nanometers (nm).

20. The structural interface according to claim 14, wherein the selective reflection band is at least 20 nanometers (nm) wide.

21. The structural interface according to claim 14, wherein the adaptive liquid crystal material has a birefringence greater than 0.03.

22. A structural interface comprising an adaptive liquid crystal material positioned to receive electromagnetic radiation and adapted to reflect a selective band of said electromagnetic radiation;
- wherein the adaptive liquid crystal material undergoes a photo-induced or thermal-induced phase transition, or both, thereby changing its reflection band when exposed to an activating temperature or an activating light or both,
- wherein the adaptive liquid crystal material has one or more selective reflection bands with a peak wavelength ($\lambda_{max}$) selected from one of the following:
  - (a) within 400-1000 nm during hot conditions and outside 400-1000 nm during cold conditions;
  - (b) outside 3000-10,000 nm during hot conditions and within 3000-10,000 nm during cold conditions; or
  - (c) within 400-1000 nm during hot conditions and within 3000-10,000 nm cold conditions.

23. The structural interface according to claim 22, wherein the liquid crystal material comprises a mixture of one or more of: a nematic liquid crystal, a smectic liquid crystal, a chiral dopant, a photo-active chiral dopant, an up-converting dye, a polymer, a polymerizable component, and a cholesterol based chiral liquid crystal.

24. The structural interface according to claim 22, wherein the liquid crystal material comprises two or more liquid crystal materials with different phase transition temperatures.

25. The structural interface according to claim 22, wherein said structural interface is selected from one or more of the following:
- a layer applied to an exterior or interior surface of a structure,
- a layer applied to a window,
- integrated into an envelope material, or
- integrated into a window.

26. The structural interface according to claim 22, wherein the liquid crystal material undergoes a phase transition between cholesteric and smectic when exposed to a temperature change of 10° C. or greater.

* * * * *